April 30, 1968   J. B. BEAUDRY   3,380,119
INJECTION MOLDING MACHINE WITH CONTROLS FOR
INJECTING AND CLAMPING
Filed June 9, 1966
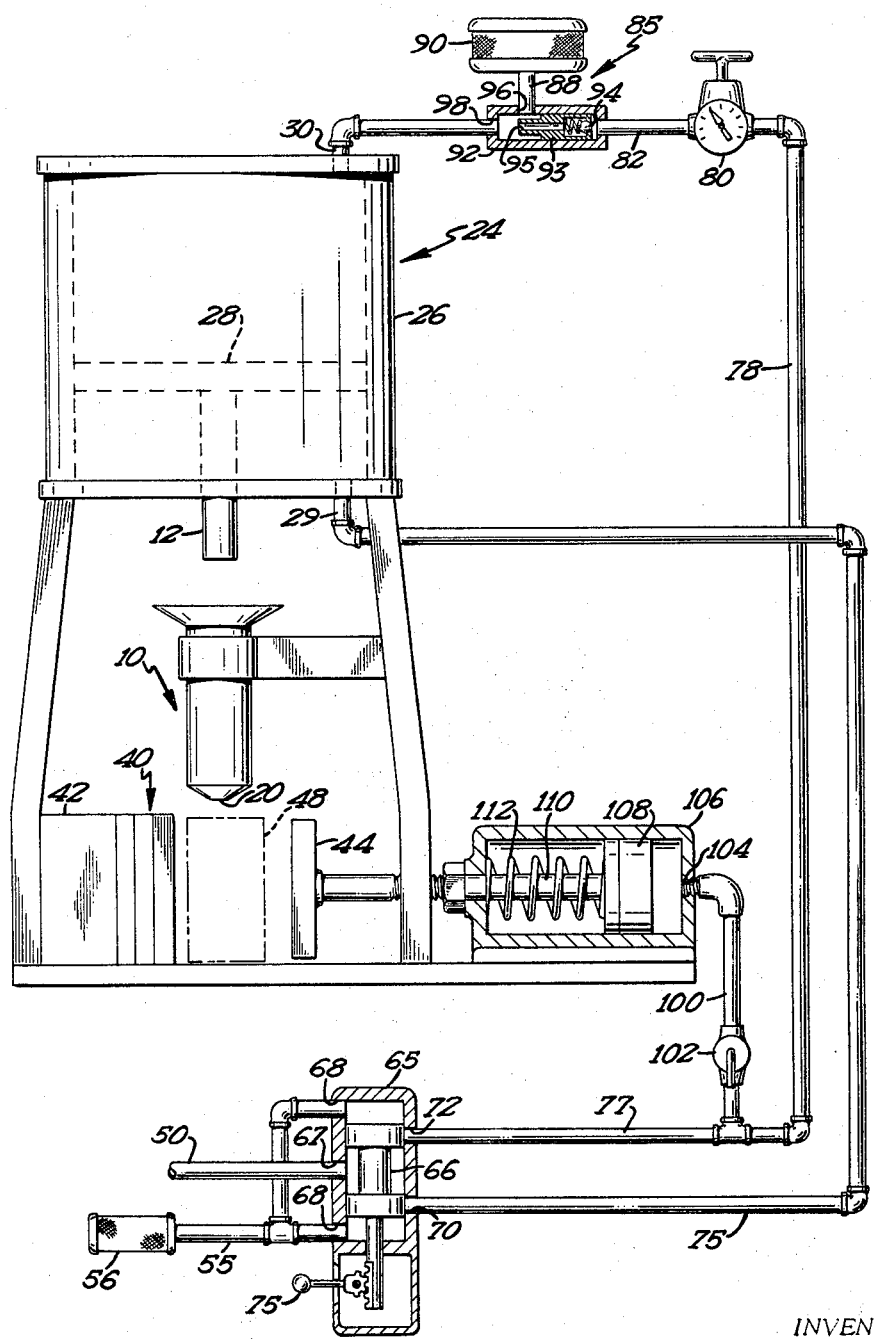
INVENTOR.
JOHN B. BEAUDRY
BY Schroeder, Siegfried
& Ryan   ATTORNEYS United States Patent Office 3,380,119
Patented Apr. 30, 1968

3,380,119
INJECTION MOLDING MACHINE WITH CONTROLS FOR INJECTING AND CLAMPING
John B. Beaudry, Minneapolis, Minn., assignor of one-half to John R. Beaudry, Minneapolis, Minn.
Filed June 9, 1966, Ser. No. 556,319
7 Claims. (Cl. 18—30)

This invention relates to improvements in injection molding apparatus and more particularly to an improved control of an injection molding apparatus particularly adapted for injection molding of a semi-automatic nature.

In injection molding machines, varying types of molds are used some of which are divided molds which are held together through a suitable clamping apparatus during the molding operation. In such apparatus, separate motive means operates the clamping portion of the machine apart from that which forces the heated molding material through an injection cylinder into the mold. A desired sequence of operation for such machine requires that the mold be clamped before the heated molding material is forced into the same. In the past, complex and expensive apparatus and circuits have been required to perform such a function and provide this sequence of operation in a molding machine.

The present invention is directed to a simplified control circuit operated from a single control valve which will provide the desired sequence of operation in the clamping and injection functions of the machine to hold and fill small multipart molds. The improved molding apparatus of the present invention includes a simplified control circuit which provides this sequence of operation without special timing devices or special circuitry to operate in sequence a number of motors. In addition, it is necessary with such machines that the injection portion of the apparatus will be moved to a retracted position either prior to or substantially the time as the release of the clamping portion holding the mold. In the improved apparatus of the present invention, the single control valve together with motor sizings, a regulating device and simplified exhaust systems insure that the proper sequence of operation will take place in both the molding and retracting functions. In addition, the improved apparatus includes provision for isolating the clamping portion of the machine from the remainder thereof when such operation is not desired.

Therefore it is an object of this invention to provide an improved, efficient and simplified injection molding apparatus.

Another object of this invention is to provide in apparatus of this type a simplified arrangement for utilizing a fluid source, such as air, to actuate in sequence a clamping actuator and a ram actuator through a simplified control circuit.

A still further object of this invention is to provide a low cost apparatus for this type which is easy to use and maintain.

These and other objects of this invention will become apparent from a reading of the attached description together with the drawing wherein.

My improved injection molding apparatus is shown schematically in the drawing as incorporating an injection cylinder 10 in which molding material (not shown) is adapted to be positioned and heated through means (not shown) for movement or injection into a mold. Associated with the cylinder 10 is a plunger 12 which moves between a retracted and extended position to engage the molding material in the cylinder and inject the same therefrom through an orifice at the lower extremity of the cylinder 20. The injection cylinder is mounted on a suitable support stand 22 and the plunger is carried by a fluid actuator or air motor 24 which incorporates the cylindrical casing 26 and a cooperating piston 28 therein with the plunger 12 being attached to the piston and extending through the end wall of the cylinder 26. The actuator motor is suitably attached to the stand 22 and includes ports 29, 30 at the ends of the cylinder through which the fluid or air enters to act against the piston on opposite sides thereof. The fluid under pressure will cause the piston and hence the plunger to move between retracted and extended positions in a conventional manner. Motor 24 is bidirectional in that air introduced at one side of the piston will cause movement in a direction to displace air or fluid on the opposite side of the piston exhausting the same through the opposite port in the cylindrical casing.

Also mounted on the support 22 is a clamp structure, indicated generally at 40, which clamp structure includes a flange portion 42 on the support which cooperates with a clamping plate 44 carried by a clamp actuator indicated generally at 45. The clamping plate 44 is movable relative to the clamp plate 42 to hold a suitable mold indicated in phantom at 48 normally of the split type. In the clamped position of the mold 48, the flange plate 44 moves the mold against the plate 42 to position the same directly below the orifice end 20 of the injection cylinder 10 such that the molding material in heated form will be forced from the orifice into the mold by movement of the plunger 12 toward the extended position. The clamp is operated to engage and hold the mold prior to movement of the plunger in such a manner that the molten molding material from the injection cylinder will not be dispensed therefrom until after the mold 48 is securely positioned therebetween. The improved molding apparatus is operated from a fluid source, shown herein as an air supply including an inlet air conduit 50 and an exhaust conduit 55 having a muffler 56 on the extremity of the same.

The improved injection molding apparatus is controlled through the operation of a single control device, indicated generally at 60, which is basically a conventional four-way valve. As shown in the drawing, the four-way valve includes a cylinder body 65 and a double ended piston valve element 66 which cooperates with inlet 67 and outlet 68 ports in the cylinder body to direct fluid flow through the cylinder to outlet ports 70 and 72 positioned to the cylinder. The fluid flow through the interior of the cylinder is controlled by the land portions on the extremity of the movable valve element in a conventional manner. The valve element has suitably connected thereto a handle 75 which displaces the valve element toward either end of the cylinder to provide two operative positions and a pair of reversing flow passages through the valve in a conventional manner with a neutral or rest position being provided intermediate therebetween in which the outlet ports are closed from the inlet and exhaust ports 67, 68.

As will be seen schematically in the drawing, the main air line 50 is connected to the inlet port 67 and the return air port from either end of the cylinder 68 is connected to the return line 55 and the muffler 56. One of the exhaust ports 70 is connected through a conduit or pipe 75 leading to one end of the fluid motor or actuator 24 being connected thereto at the port 29 on the lower extremity of the same. The opposite outlet port 72 is connected through pipes or conduits 77 and 78 to an air pressure regulator 80 and a conduit 82 leading therefrom to a bypass and check valve combination 85 leading to the opposite port 30 in the cylinder 26 of the actuator 24. Associated with the bypass valve 85 is an exhaust passage 88 and the muffler 90. The bypass and check valve is of the conventional type including a cylindrical casing 92 with a movable piston element 93 therein having a passage 95 through the center of the same and a spring bias ball check 94 at one extremity therein. Cylindrical casing 92 has an outlet passage 96 leading to the passage 88 and muffler 90. The opposite extremity of the cylindrical casing has an outlet 98 connected to the inlet port 30 of the actuator 24. As will be seen schematically in the drawings, air pressure applied to the ball check end of the check valve will cause the piston element 90 to move within the cylindrical casing 92 closing off the passage 96 therein and unseating the ball check 94 to permit air flow through the outlet 98 to the interior of the air cylinder of actuator 24 through the port 30. Upon the presence of air under pressure at this side of the piston 28, the piston and hence the plunger 12 will move down in the cylinder causing extension of the same to cooperate with the injection cylinder 10 and force molding material therefrom. With movement of the cylinder, air in the cylinder below the piston will be forced out of the port 29 and through the passage 75 and port 68 in the control valve 60 to the exhaust passage 55 and muffler 56. With introduction of air in the opposite direction, that is through the port 29, causing the piston 28 to move up in the cylinder retracting the plunger 12, air will be forced from the opposite side of the cylinder through the port 30 moving the piston 93 of the bypass valve back and causing seating of the ball check 94 therein. This will open the passage from the outlet 98 to the outlet 96 to provide for exhausting of air from this side of the cylinder through the passage 88 and muffler 90. The presence of the pressure regulator 80 in the conduit 82 prevents air movement in the reverse direction through the piping 78.

Simultaneously with positioning of the control valve to an "on" position in which the air from the inlet passage 50 is directed through the outlet port 72 therein and to the air conduit or pipe 77, air will also be introduced to the pipe 100 or conduit leading to the actuator 45. The conduit 100 includes an "on" "off" valve 102 and is connected to an inlet port 104 of the actuator 45 which is comprised of a cylinder 106 and piston 108. The actuator 45 is of the ram type with air being introduced on one side of the piston only and with the piston having a shaft 110 extending through the wall of the cylinder to mount the clamping flange 44. If desired, a suitable return spring 112 is positioned on this side of the cylinder encircling the shaft 110 to urge the piston in the opposite direction. With the control handle 60 operated toward the "on" position connecting port 67 with port 72 and the air supply with a conduit 77, the outlet port 70 is connected to the return port 68 to return air from the conduit 75 to the exhaust conduit or pipe 55. As air is introduced into the conduit 77, 78 and with the valve 102 in the "on" position, the clamping actuator 45 will actuate first because of its smaller size and volume. This will displace the clamping plate 44 toward the mold 48 to clamp the same against the clamp support 42 beneath the injection cylinder 10. The presence of the pressure regulator 80 in the conduit or pipe 78 will regulate the air pressure applied to the upper end of the cylinder or actuator 24. Movement of the piston 28 and hence the plunger 12 will be delayed because of the air volume or capacity in this cylinder so that the clamping function will be sequenced prior to movement of the plunger 12 into the injection cylinder to dispense molding material therefrom. With the reversal of the control actuator 60 to the opposite position or the handle 75 therein, the outlet port 72 is connected to the exhaust port 68 and the exhaust line 55 of the air supply and the inlet port 67 is connected to the outlet port 70 connecting the air supply from the pipe 50 to the line or conduit 75 and port 29 of the large actuator controlling or moving the plunger 12. This will cause the piston to move up and force air above the piston through cylinder port 30 displacing the bypass valve 85 to connect the outlet port 88 therein to the outlet port 30 of the cylinder actuator 24. This will allow a rapid discharge of the air above the piston 28 as the piston is moved up under the presence of air beneath the same. Thus the cylinder will move the plunger 12 toward a retract position. Simultaneously therewith, the ram cylinder 45 will be connected through the conduit 77 to the exhaust conduit 55 allowing air in front of the piston 108 to be discharged through the conduit 100. The presence of the spring 112 will urge the piston to force the air on the active side of the cylinder therefrom retracting the clamping plate 44 to release the mold 48 from the clamp.

With this simplified arrangement, a single control valve will provide a desired sequence of operation in operation of the clamp prior to the time that the injection cylinder is activated by its plunger to eject molding material into a mold. With a reversal in direction of the control valve, the plunger 12 of the injection molding apparatus is withdrawn from the injection cylinder and the clamp is released. This simplified arrangement of an injection molding apparatus provides for a simplified control circuit suitable for small piece part molding of the semi-automatic type. It will be recognized that while the fluid source is shown herein as air, that a suitable liquid source such as hydraulic fluid could be utilized with the removal of the air mufflers and the connecting of the same together and to the return side of a hydraulic source.

Therefore in considering this invention it should be remembered that the present disclosure is intended to be illustrative only and variations in materials and arrangement of parts may be made. Therefore I wish to be limited only by the appended claims.

What is claimed is:

1. An injection molding apparatus comprising, an injection cylinder, an injection plunger adapted to cooperate therewith to move material from the injection cylinder to a mold in an injection molding process, a fluid motor for operating the injection cylinder to move the plunger between a retracted and extended position in said cylinder, a fluid source for energizing the fluid motor including intake and exhaust lines, a single control valve means having a pair of outlet ports and an inlet and return port, connection means connecting the inlet and return ports of the valve means to the intake and exhaust lines of the fluid source, further fluid connection means connecting the outlet ports of said single control valve means to the fluid motor at opposite sides thereof to selectively move the motor and hence the plunger of the injection cylinder between operative positions: a clamp adapted to hold a mold in position relative to the injection cylinder in a molding operation, a second fluid motor operating the clamp to move the clamp in a holding position with a mold, further connection means connecting one of the outlet ports of the said single control valve means to the second fluid motor operating the clamp, said valve means when operated to one position being operative to direct fluid through one of said outlet ports connected to the clamp motor and to one side of the first motor operating the plunger to cause the plunger to move into the injection cylinder and the clamp to clamp the mold, and means including the connection between the single control valve and said first and second fluid motors to cause said clamp to be first operated and the second fluid motor to be operating the injection cylinder plunger to be operated thereafter.

2. The injection molding apparatus of claim 1 in which said last named means includes a pressure regulator positioned in the fluid connection line from said one of said outlet ports to the first fluid motor causing movement of the plunger toward the extended position.

3. The injection molding apparatus of claim 2 in which said last named means includes further a difference in relative sizing of said first and second fluid motors such that the first named fluid motor is substantially larger than the second fluid motor.

4. The injection molding apparatus of claim 3 in which the fluid connection line to the first fluid motor having the pressure regulator therein includes in addition a check valve and an exhaust port which permits reversal of flow from one side of said first fluid motor and a rapid exhaust of fluid therein whenever said first fluid motor is operated toward a retracted position.

5. The injection molding apparatus of claim 4 in which said single control valve means is a four-way valve having two operative positions in which the outlet ports are selectively connected to the fluid source and the outlet port not connected to this fluid source is connected to the exhaust means and a neutral position in which all ports in the valve are closed.

6. The injection molding apparatus of claim 5 in which the valve means is moved between the two positions to cause the first fluid motor to receive fluid on opposite sides thereof to cause extension and retraction of the plunger in the injection cylinder and the second fluid motor operating the clamp is connected to receive fluid in one of said valve positions and exhaust fluid in the other of said valve position.

7. The injection molding apparatus of claim 6 and including additional valve means positioned in the fluid connection line to the second fluid motor operating the clamp to isolate the second fluid motor from the single control valve means and the first fluid motor selectively.

References Cited
UNITED STATES PATENTS

| | | | |
|---|---|---|---|
| 2,568,042 | 9/1951 | Vltavsky | 18—30 |
| 2,804,752 | 9/1957 | Norman et al. | 18—30 |
| 3,016,574 | 1/1962 | Fischer et al. | 18—30 |

WILBUR L. McBAY, *Primary Examiner.*